United States Patent
Karlein et al.

(10) Patent No.: US 9,156,092 B2
(45) Date of Patent: Oct. 13, 2015

(54) CENTRIC CLAMPING DEVICE

(75) Inventors: Birgitt Karlein, Mellrichstadt (DE); Eugen Karlein, Mellrichstadt (DE)

(73) Assignee: Birgitt Karlein, Mellrichstadt (DE)

( * ) Notice: Subject to any disclaimer, the term of this patent is extended or adjusted under 35 U.S.C. 154(b) by 515 days.

(21) Appl. No.: 13/695,890

(22) PCT Filed: Mar. 30, 2011

(86) PCT No.: PCT/DE2011/000345
§ 371 (c)(1),
(2), (4) Date: Jan. 23, 2013

(87) PCT Pub. No.: WO2011/137884
PCT Pub. Date: Nov. 10, 2011

(65) Prior Publication Data
US 2013/0205957 A1 Aug. 15, 2013

(30) Foreign Application Priority Data

May 5, 2010 (DE) .......................... 10 2010 022 804
Jun. 15, 2010 (DE) .......................... 10 2010 023 797

(51) Int. Cl.
*B23B 31/16* (2006.01)
*B23B 31/02* (2006.01)

(52) U.S. Cl.
CPC ................. *B23B 31/02* (2013.01); *B23B 31/16* (2013.01); *B23B 31/16045* (2013.01); *B23B 2215/64* (2013.01); *B23B 2231/22* (2013.01); *Y10T 82/2552* (2015.01); *Y10T 82/2572* (2015.01); *Y10T 82/2579* (2015.01); *Y10T 279/19* (2015.01); *Y10T 279/1913* (2015.01); *Y10T 279/1961* (2015.01)

(58) Field of Classification Search
CPC .. B23B 31/16045; B23B 31/16; B23B 31/02; B23B 2215/64; B23B 2231/22; Y10T 279/1913; Y10T 279/19; Y10T 279/1961; Y10T 82/2572; Y10T 82/2579
USPC ............. 279/112, 110, 119, 118; 82/152, 155
See application file for complete search history.

(56) References Cited

U.S. PATENT DOCUMENTS 2,775,461 A * 12/1956 Ehrlich .......................... 279/119
2,828,134 A * 3/1958 Buck .............................. 279/119

(Continued)

FOREIGN PATENT DOCUMENTS

DE 127 809 C 2/1902
DE 28 08 272 A1 8/1979

(Continued)

*Primary Examiner* — Eric A Gates
*Assistant Examiner* — Chwen-Wei Su
(74) *Attorney, Agent, or Firm* — McGlew and Tuttle, P.C.

(57) ABSTRACT

A clamping device (01), for use on a lathe, includes a plurality of basic clamping supports (06), which can be moved in a star-shaped formation in relation to an axis of rotation and on each of which a clamping jaw (11) for clamping workpieces can be attached. The basic clamping supports (06) can be adjusted simultaneously by means of an adjusting drive (21, 36) of the clamping device (01). At least two basic clamping supports (06) are coupled directly or indirectly to one another by an outer rocker (15). At least in the middle of the adjusting path, a limited inward displacement of a basic clamping support (06a, 06c, and 06b, 06d, respectively) leads to a swiveling of the outer rocker (15a, 15c) and an outward displacement of the other coupled basic clamping support (06b, 06d, and 06a, 06c, respectively).

17 Claims, 7 Drawing Sheets

(56) References Cited

U.S. PATENT DOCUMENTS

| | | | | |
|---|---|---|---|---|
| 2,886,336 | A | * | 5/1959 | Reynard .................. 279/118 |
| 2,921,796 | A | | 1/1960 | Ernest |
| 3,420,539 | A | * | 1/1969 | Pahlitzsch .................. 279/112 |
| 3,704,022 | A | * | 11/1972 | Blattry et al. .................. 279/121 |
| 3,841,647 | A | * | 10/1974 | Cooper .................. 279/110 |
| 4,103,915 | A | | 8/1978 | Zdanovsky et al. |
| 4,258,928 | A | * | 3/1981 | Wiesler .................. 279/133 |
| 4,429,887 | A | * | 2/1984 | Smith .................. 279/112 |
| 4,828,276 | A | * | 5/1989 | Link et al. .................. 279/33 |
| 4,938,491 | A | | 7/1990 | Sumenko et al. |
| 2003/0102640 | A1 | * | 6/2003 | Saito .................. 279/110 |
| 2010/0038866 | A1 | | 2/2010 | Karlein |

FOREIGN PATENT DOCUMENTS

| | | |
|---|---|---|
| DE | 42 02 134 C1 | 8/1993 |
| DE | 10 2006 027 988 B4 | 7/2008 |
| DE | 10 2007 020 633 B4 | 4/2009 |
| EP | 0 314 792 A1 | 5/1989 |
| EP | 0 554 685 B1 | 7/1995 |
| GB | 1 214 959 A | 12/1970 |
| JP | H05 49207 U | 6/1993 |
| JP | 2001 087908 A | 4/2001 |
| WO | 80/00427 A1 | 3/1980 |
| WO | 2007/143976 A2 | 12/2007 |
| WO | 2008/031392 A1 | 3/2008 |
| WO | 2008/131753 A1 | 11/2008 |

\* cited by examiner

CENTRIC CLAMPING DEVICE

CROSS REFERENCE TO RELATED APPLICATIONS

This application is a United States National Phase application of International Application PCT/DE2011/000345 and claims the benefit of priority under 35 U.S.C. §119 of German Application DE 10 2010 023 797.3 filed Jun. 15, 2010, the entire contents of which are incorporated herein by reference.

FIELD OF THE INVENTION

The invention relates to a clamping device for use with a lathe or the like for clamping workpieces by means of a plurality of clamping jaws.

BACKGROUND OF THE INVENTION

Chucks for lathes in different designs are well-known from the state of the art. For clamping round workpieces, the state of the art normally uses a three-jaw chuck with lathes and a so-called four jaw chuck for clamping square workpieces. In this regard there is no need for further elaboration. Normal chucks have in common that the plurality of clamping jaws—normally three or four—are simultaneously adjusted manually, hydraulically or electrically and always have the same distance to the axis of rotation.

The present invention in particular relates to a clamping device for centric clamping of workpieces with a shape deviating from perfect roundness or of rectangular workpieces or of round workpieces with defects in shape.

It is apparent that such a clamping task cannot be accomplished with a normal three- or four-jaw chuck.

To this effect, chucks with four clamping jaws are known from the state of the art, wherein in each case two opposite clamping jaws have a common drive and can be adjusted simultaneously. The method used in this context is based on a pair of jaws, opposite to one another by 180 degrees, being initially moved toward the workpiece and centering the workpiece on the common axis toward the axis of rotation. Subsequently, the pair of jaws shifted by 90 degrees is moved toward the workpiece and also performs the task of ensuring the centering in the direction of the axis of rotation. After this centering process, the clamping pressure necessary for lathing is applied. This method has proven successful in connection with clamping using clamping jaws even though the workpiece is not centered exactly on the axis of rotation and the clamping pressure on the four jaws is normally slightly different. Building on this method, in order to improve and accelerate the clamping process, hydraulically operated chucks are known instead of the mechanic drive, wherein an essential difference to manual clamping is based on the double-stroke cylinder.

What is disadvantageous with this solution is, however, that centric clamping with a uniform clamping pressure on all clamping jaws is still not possible, in particular in connection with defects in shape. There is no real possibility for reliable centric clamping of blanks with shape deviations. In particular in connection with unroundnesses, it follows inevitably that a jaw does not abut on the workpiece or that the pairs of jaws shifted by 90 degrees abut on the workpiece with different clamping pressures.

In particular the attempt at centric clamping of the workpiece leads to a significant clamping effort when several concentricity checks and subsequent recentering of the workpiece become necessary. Furthermore, the chuck has to be rotated each time to that end, or the machine operator has to go around the face chuck when working at a big rotary table.

For the application under consideration, the workpieces are therefore normally clamped on so-called face chucks. In this respect, the clamping jaws of the chuck—normally, there are four of them—can be adjusted separately. In this respect, the clamping jaws are mounted directly or indirectly in guides with a radial orientation. In this respect, it is possible to clamp workpieces with largely any geometry.

A well-known embodiment comprises four guides on the upper section of the face chuck, which are arranged at an angle of 90 degrees in relation to one another and centric in relation to the axis of rotation. In these guides, basic jaws are mounted slidably. These basic jaws serve to hold the actual clamping jaws, which are normally screwed onto the basic jaws. The basic jaws are each equipped with a spindle drive and can thus be adjusted separately. In this respect, the basic jaws cover the whole clamping range of the face chuck. This design can be compared with a typical chuck, except that each clamping jaw is adjusted separately.

In another well-known embodiment, the face chuck surface is equipped with four detent devices shifted by 90 degrees in relation to one another. These detent devices are also centric in relation to the axis of rotation. So-called jaw boxes are mounted here, wherein these can be adjusted and fixed radially by means of the detent devices. These jaw boxes are each equipped with a guide, which is also radial in relation to the axis of rotation. In these guides, basic jaws are mounted slidably, which serve to hold the clamping jaws. Here, each individual basic jaw can also be adjusted by means of a spindle drive. With this embodiment, the jaw stroke is restricted to a short path. Due to the adjustability of the jaw boxes, a large clamping range is also covered with such a chuck.

Consequently, it is not at all guaranteed with this clamping method that all jaws abut on the workpiece with the same clamping pressure. In particular in connection with clamping thin-walled workpieces or rings, clamping errors can occur. A particularly problematic situation arises when thin-walled workpiece blanks are not perfectly round. This can lead to misjudgements on the part of the machine operator when concentricity checks at the workpiece reveal constant deviations. In this respect, with this clamping method the quality of the workpiece to be processed is highly dependent on the experience and skills of the machine operator.

Furthermore, so-called pendulum jaws or system pendulum apparatuses are known from the state of the art, wherein two clamping jaws are swivelably mounted to a basic support in each case. Even though this solution allocates a uniform clamping pressure to two clamping jaws at a time in an advantageous fashion, it is almost impossible to clamp unround workpieces. As soon as the opposite clamping jaws of two pendulum jaws abut on the workpiece fixing it, it is almost impossible to displace the workpiece by means of the other transverse clamping jaws. Consequently, the other two pairs of pendulum jaws can only be adjusted toward the workpiece without allowing an exact centering in the second orientation thereof, however. It seems to suggest itself that, in order to ensure the retention force required, only one pendulum jaw belonging to the second pair of pendulum jaws can abut rigidly during the clamping process whereas at least one pendulum jaw cannot generate enough clamping pressure. A clamping process at staggered intervals with the jaw pairs shifted at an angle of 90 degrees, which would be necessary for workpieces which are not round, therefore prevents the use of pendulum jaws with the purpose of enabling centric clamping of workpieces without any deformations arising.

SUMMARY OF THE INVENTION

Accordingly, it is the object of the present invention to provide a device which enables centric clamping of workpieces with deviations from a round or square shape, where a uniform clamping pressure is applied at and allocated to all clamping points.

A generic clamping device is to be used on a lathe, in particular with a face chuck. Instead of being restricted to the sole use on a regular lathe, the device can also be used on other machine tools. In this respect, an unconditional use for clamping a workpiece, for instance, with a machining center is possible. The device is applicable in particular when the object is to enable centric clamping of workpieces without any deformations arising.

In the present case, the generic clamping device comprises a plurality of support guides arranged in a star-shaped formation in relation to an axis of rotation in a device support. With a non-rotating clamping device—or when the device is used with a machining center—the central axis thereof corresponds to the axis of rotation described in the following. In the support guides, one basic clamping support, on which at least one clamping jaw for clamping workpieces can be attached, is mounted slidably in one support orientation in each case. In this respect, the support orientation is always radial in relation to the axis of rotation. By means of an adjusting drive of the clamping device, the basic clamping supports can simultaneously be adjusted in the respective support orientations.

In this respect, the generic clamping device accomplishes the task of clamping a workpiece by means of several clamping jaws simultaneously, as is known for all conventional three- or four-jaw chucks.

According to the invention, it is now envisaged that at least two basic clamping supports are coupled directly or indirectly to one another by means of an outer rocker, wherein, at least in the middle of the adjusting path of the basic clamping supports, a limited inward movement of a basic clamping support leads to a swiveling of the outer rocker and to an outward movement of the coupled basic clamping support.

The type of connection between the basic clamping supports and the outer rocker is initially irrelevant. In principle, it has to be considered here that moving one basic clamping support in a radial direction simultaneously leads to an opposite movement of the other basic clamping support due to the coupling by means of the outer rocker.

The newly created embodiment enables centric, uniform clamping of workpieces with a shape deviating from perfect roundness in a simple way. The compensation of two basic clamping supports due to the coupling by means of the outer rocker makes it possible that, when a first clamping jaw has abutted, the second basic clamping support and thus the second clamping jaw is aligned by swiveling the outer rocker, without the workpiece having already been fixed rigidly to the first clamping jaw previously. Consequently, in particular with a chuck operated manually, a clamping process can be carried out by means of the central clamping device, wherein component parts are clamped centrically, a uniform clamping pressure being generated with all clamping jaws. Consequently, this device is particularly suitable for centric, reliable clamping of unround workpieces, I.e. workpieces with a clamping surface deviating from perfect roundness.

Due to the compensation by means of the outer rocker, not only are unroundnesses compensated, but it is also ensured that there is a uniform clamping pressure at the clamping points. This makes it possible to clamp even workpieces which would otherwise suffer from deformations in reaction to local clamping pressures being too high.

Equally, the field of application with clamping square and rectangular workpieces is being opened up. In this case, centric clamping of workpieces is also ensured.

In this respect, the newly created embodiment combines the advantages of a conventional three- or four-jaw chuck with the advantages of clamping by means of a pendulum device or by means of clamping jaws which can be adjusted separately. Thus it ensures flexibility as to which workpieces can be clamped and at the same time makes rapid and simple clamping possible.

With respect to the arrangement of the clamping jaws in relation to the basic clamping support, there are several options. In principle, the design of the clamping jaws is initially irrelevant here. To this effect, it is only required that they can be mounted to the basic clamping supports, wherein these clamping jaws can thus simultaneously be adjusted by means of the basic clamping supports. Equally, it is possible to use, without any limitations, for instance pendulum jaws as clamping jaws or to mount them to the basic clamping supports.

Advantageously, in a first variation, a jaw guide, which is arranged in parallel to the support guide, is arranged at the respective basic clamping support. Here it is envisaged that at the jaw guide, the clamping jaw is also slidable and fixable radially in relation to the axis of rotation. Alternatively to using a clamping jaw, a system pendulum apparatus can be used, which is also slidable in and fixable at the jaw guide, wherein the clamping force is shared between two clamping points each, thus leading to an even better force distribution and pressure decrease. In this case, a system pendulum apparatus in turn comprises two spaced, swivelably mounted clamping surfaces.

Alternatively to the embodiment comprising one jaw guide, it can be advantageous to include two jaw guides at the basic clamping support, which are arranged symmetrically to the support guide. Here, symmetry refers to a plane formed by the axis of rotation and the center of the support guide. In this respect, it is obvious that the jaw guides are also either arranged in parallel and spaced or, in an advantageous fashion, are also arranged in a star-shaped formation in relation to the axis of rotation. It is obvious that, due to the variable position of the basic clamping supports in the device support, the jaw guides cannot be oriented radially and centrically in relation to the axis of rotation, but that this can only be a present state within the adjusting range of the basic clamping support. The arrangement of two symmetrical support guides is advantageous in case the clamping points or clamping jaws are required to be twice as many. However, it has to be considered that the two clamping jaws of one basic clamping support are not mounted swivelably in relation to one another and that consequently, a uniform distribution of the clamping force on the two clamping jaws of one basic clamping support is not necessarily ensured.

Alternatively to using a system pendulum apparatus being slidable in a jaw guide it is advantageous to mount a system pendulum apparatus at the basic clamping support. In this case, the system pendulum apparatus comprises at least two jaw guides, which in turn can comprise clamping jaws being slidable and fixable thereon. Equally, by using a pendulum device it is herein ensured that with both clamping jaws of the pendulum device, the same clamping pressure is applied when clamping the workpiece.

In any case, it is particularly advantageous to include a detent toothing at the jaw guide—regardless of the variation thereof, wherein at least one clamping jaw or one pendulum device can be moved along the jaw guide and can be fixed in the detent interval. By means of the jaw guide comprising the detent toothing, a simple and reliable fixation of the clamping jaws at the basic clamping support can be realized, wherein, however, there still is a large clamping range. Consequently, in order to realize the clamping device according to the invention, only a limited adjusting range of the basic clamping supports is required. Here, this adjusting range has to be determined at least slightly larger than specified by the interval of the detent toothing.

Particularly advantageous embodiments comprise at least two assemblies of an outer rocker and two basic clamping supports. This means that basic clamping supports are coupled with an outer rocker by twos, forming an assembly. This does not envisage that the two basic clamping supports which are already coupled by means of an outer rocker are additionally coupled with the other respectively neighboring basic clamping supports. In this respect, there is always double the number of basic clamping supports in relation to the number of outer rockers. Consequently, in the simplest case this embodiment comprises at least two assemblies of two outer rockers and four basic clamping supports. Equally, this assembly can be multiplied and in particular, it can thus also comprise an assembly of three outer rockers and six basic clamping supports or of four outer rockers and eight basic clamping supports.

Advantageously, a symmetrical construction of the outer rocker and the connection to the basic clamping supports ensures regular movements as well as a uniform force distribution here.

Even though hydraulic solutions or wire rope hoists would be conceivable as a solution in order to realize the function of the outer rocker, the person skilled in the art will initially envisage a rigid component for the outer rocker. In this respect, it is obvious that it is required for the functional construction of an assembly of outer rocker and two basic clamping supports to enable compensation between the outer rocker in the swiveling movement thereof and the basic clamping supports in the adjusting movements thereof. Due to the basic clamping supports being adjustable in the support orientations radially in relation to the axis of rotation, the distance between the two coupled basic clamping supports to one another consequently changes. In this respect, when the coupling is realized by means of the outer rocker, compensation is required for this changing distance between two basic clamping supports at a time. Furthermore, the fact that two basic clamping supports are movable in opposite directions in the support orientations, as envisaged according to the invention, necessitates a possibility for compensation in the connection to the outer rocker.

Here, one option is, for instance, to include ball joints at the end of the outer rocker, which engage in bores in the basic clamping supports and to this effect are movable at a tangent to the axis of rotation. What is disadvantageous with this solution is, however, that there is a friction of the ball joint in the bore in the outer rocker due to a thrust movement in the bore. Consequently, proper functioning cannot be reliably guaranteed over a long period of time.

In this respect, it is particularly advantageous to arrange one compensating element in each case between the outer rocker and the two coupled basic clamping supports. For this purpose, a bearing swivelable to both sides is required between the compensating element and the outer rocker or the basic clamping support. Consequently, when one basic clamping support is displaced by adjusting the compensating element, this can lead to a swiveling of the outer rocker and to an opposite adjusting of the other compensating element and consequently to the opposite displacement of the other basic clamping support in a simple way.

In order to realize the clamping movement, it is particularly advantageous if the outer rocker can be slid linearly in a direction of thrust by means of an adjusting drive. Due to the fact that two basic clamping supports are coupled at the outer rocker, a displacement of the outer rocker in the direction of thrust thus simultaneously leads to a movement of the basic clamping supports in the respective support orientations.

It is particularly advantageous here to arrange the two basic clamping supports coupled at the outer rocker, or consequently the two support orientations thereof, symmetrically in relation to a plane formed by the direction of thrust and the axis of rotation. In this way, it is ensured that mounted clamping jaws move regularly toward the axis of rotation or away from the axis of rotation, initially leaving the swivelability of the outer rocker or the opposite displaceability of the basic clamping supports out of consideration.

Furthermore, it is particularly advantageous to connect the outer rocker swivelably with a lateral slide, which can be moved in the direction of thrust. To this effect, the lateral slide is mounted in the device support in such a way that, by means of the adjusting drive, the lateral slide can be moved in the direction of thrust and is fixed transversely in relation to the direction of thrust, I.e. the lateral slide can exclusively be moved in one axis in the direction of thrust. The bearing can here be realized by means of the adjusting drive and/or alternatively by means of guides in the device support.

In order to ensure a regular movement of all basic clamping supports of a clamping device, it is particularly advantageous to let the direction of thrust or the center of the lateral slide subtend the axis of rotation. In this case, it is required that the swivelable connection of the outer rocker to the lateral slide is also located in the center of the lateral slides, I.e. it is connected by adjusting the lateral slides toward the axis of rotation or away from the axis of rotation. Even though an exactly perpendicular orientation of the direction of thrust in relation to the axis of rotation is not required here, it simplifies the structure and production of the clamping device.

There are several options to realize the adjusting drive, wherein an adjusting spindle arranged in the direction of thrust is used as an adjusting drive in a particularly advantageous fashion. Here, the adjusting spindle is mounted in a first lateral slide with a left-hand thread, and in a second, opposite lateral slide with a right-hand thread. Consequently, a rotating movement of the adjusting spindle leads to an opposite movement of the lateral slides toward one another or away from one another. It is obvious that with the movement of the adjusting spindle and with the opposite movement of the lateral slides, consequently the outer rockers are also displaced, triggering a movement of the basic clamping supports or the clamping jaws toward or away from one another.

Even though it is not stringently required, here the adjusting spindle is advantageously mounted in such a way that it can be rotated and is fixed in the direction of thrust in the device support. It is particularly advantageous here to position the adjusting spindle in the axis orientation in the center of the axis of rotation, wherein the axial position of the adjusting spindle can be set by means of adjustment tools such as adjustable nuts. In this way, it is ensured that the lateral slides on both sides have the same distance to the axis of rotation. It is obvious that, for instance in order to attach a drive to the adjusting spindle or to mount the adjusting spindle, the lateral slides do not imperatively have to be arranged symmetrically. In this respect, the same distance to the axis of rotation refers to the functional allocation in connection with the two respective outer rockers.

The position of the adjusting spindle is initially irrelevant. However, it is particularly advantageous to arrange the axis thereof perpendicular in relation to the axis of rotation. In this way, a symmetrical structure of the lateral slides is initially made possible. Furthermore, it is particularly advantageous to let the axis of the adjusting spindle subtend the axis of rotation. In this way, it is ensured that the adjusting force acts on the lateral slides as pulling force or compression force and that the transverse forces are minimized. Consequently, a guide for the lateral slides in the device support does not have to be included in any case.

As an alternative solution, it is possible to couple two lateral slides with a wedge element by means of a wedge guide. In this case, an adjusting movement of the wedge element in one adjusting direction by means of the adjusting drive leads to an opposite movement of the lateral slides. Consequently, the clamping task is also accomplished to the effect that the adjustment of one wedge element by means of the adjusting drive leads to the clamping jaws moving toward the axis of rotation or away from the axis of rotation. In order to realize this, wedge guides which are oriented toward one another at an acute angle are required. The person skilled in the art will choose the angle based on the required adjusting paths of the lateral slides and the required adjusting force, wherein a small angle leads to a small adjusting path and high adjusting forces.

Furthermore, in the assembly it is expedient to orient the adjusting direction perpendicular in relation to the direction of thrust. In this respect, it is ensured that the adjustment of the wedge element leads to an equal displacement of the lateral slides. It is particularly advantageous here to again use an adjusting spindle which can be mounted in the device support and which in the wedge element leads to an adjustment thereof. Here, it is also conceivable to mount the adjusting spindle axially rigidly in the wedge element and to provide the adjusting thread in the device support.

Alternatively to adjusting the direction of the wedge element perpendicular in relation to the axis of rotation, it is possible, when a hydraulic or pneumatic or electrical drive is used, to select the adjusting direction in parallel or corresponding to the axis of rotation. As no access for operation purposes is required in this case, it is irrelevant that the adjusting drive is arranged completely within the clamping device or behind a clamped workpiece in this respect.

Even though a position of the wedge element is predetermined by the wedge guides engaging in the lateral slides on both sides in connection with the adjusting drive, it is particularly advantageous to mount the wedge element in turn in a linear guide in the device support. In this way, it is in particular ensured that the wedge element is not canted or jammed in the adjusting process.

Furthermore, it is possible to adjust the lateral slides like basic jaw guides of a normal three jaw chuck, for instance. In this way, it is made possible to provide basically any number of lateral slides with the respective coupling assemblies. Equally, a realization alternative is made available hereby, wherein one part of the advantageous embodiment of a clamping device is realized in the form of three lateral slides by means of an existing three jaw chuck with the basic jaw guides of the three jaw chuck and wherein the upper section of the device support is mounted to the three jaw chuck with the basic clamping supports and the relevant coupling assembly as a single package.

Due to the initial free displaceability of one basic clamping support in relation to the coupled basic clamping support, it is advantageous to provide at least one position in which the displaceability of the basic clamping supports is prevented. Here, it is envisaged that in an advantageous embodiment, an internal and/or external end position is allocated, which is characterized by the limitation of the adjusting path of two coupled basic clamping supports in the respective radial guide orientations in connection with a movement toward the axis of rotation or away from the axis of rotation. In this respect, a limitation assembly works in such a way that a compensating movement between two basic clamping supports coupled by the outer rocker is prevented in the end position. In this way, a swiveling movement of the corresponding outer rocker is prevented simultaneously. Even though it is irrelevant for the clamping process in itself, it is particularly advantageous, however, for the provisional positioning of the workpiece at the chuck if the basic clamping supports in their end positions have a basically similar distance to the axis of rotation. In this way, the workpiece can provisionally be oriented at an equal distance to each clamping jaw when being inserted.

In order to realize the limitation assembly, it is possible in a first advantageous embodiment that, in the end position the basic clamping supports abut on abutting surfaces in the device support. This means that the support guide comprises a limitation in such a way that the basic clamping supports have a defined end position in the device support, independently of the outer rocker. In this way, the adjusting path of the basic clamping supports is defined by means of the support guide or by means of an allocation of the basic clamping supports to the device support.

Equally, it is possible to envisage the support guide beyond the end position. This can possibly be required when the end position in the support guide cannot be ensured reliably anymore, for instance due to dirt. Alternatively to the first embodiment of the limitation assembly, it is advantageous here to construct the limitation assembly in such a way that spaced abutting surfaces, which abut on the device support in the end position are provided at the outer rockers. This relates to the fact that the displacement of the outer rocker leads to an abutting on the device support. Consequently, the outer rocker is initially prevented from swiveling, independently of the consideration of the basic clamping supports. Simultaneously, however, preventing a swiveling of the outer rocker leads to the rigid position of the two coupled basic clamping supports in relation to one another or to the desired end position.

This limitation assembly at the outer rocker can be realized with the same mode of operation by means of, for instance, two spaced, projecting bolts at the device support, which engage in longitudinal grooves in the outer rockers. Here, the length of the longitudinal grooves defines the possible path of the outer rockers and consequently the end position or positions, in which the outer rocker will be prevented from swiveling.

It is obvious that both modes of operation can be used to define the end position. Thus it is possible to provide, in order to define the end position in the movement toward the axis of rotation, for instance the limitation assembly directly at the basic clamping support and the end position in the direction away from the axis of rotation by means of a limitation assembly at the outer rocker.

Furthermore, it is advantageous to arrange a swivelable central rocker at the device support. Here coupling elements, which are equally attached swivelably and connected swivelably to one outer rocker each, are to be provided at each of the two ends of the central rocker. It is obvious that two outer rockers have to connected which are diagonally opposite across the axis of rotation. Alternatively to the connection at the outer rockers, a connection of the coupling elements with the compensating elements or the basic clamping supports can be selected as well. In a particularly advantageous way, the central rocker is mounted in a bearing corresponding to the axis of rotation.

By the diagonal coupling, it is achieved that opposite basic clamping supports are moved toward the axis of rotation simultaneously. In this way, the centering movement of the clamping device according to the invention is improved considerably. However, there is still the advantageous compensating movement between two basic clamping supports by means of the outer rocker. Consequently, with four basic clamping supports, the opposite basic clamping supports always have the same distance to the axis of rotation. Off-center clamping of a workpiece, which could not be ruled out otherwise, is prevented advantageously by this embodiment.

It is particularly advantageous to construe the adjusting path of the basic clamping supports in such a way that it amounts to between 1 mm and 50 mm. When using displaceable clamping jaws by means of the use of jaw guides, the adjusting path of the basic clamping supports can be reduced in particular to a value between 5 mm and 15 mm without there being a loss of adjusting range for the clamping device according to the invention. In this respect, a small adjusting range is made possible by the clamping device according to the invention or for the adjustment of the basic clamping supports whereas a large adjusting range is realized by means of the displaceability of the clamping jaws in the jaw guide. Furthermore, the adjusting path can be defined depending on the detent toothing so that it is sensible to envisage at least double the detent distance as adjusting path for the basic clamping supports.

In particular in connection with large clamping devices for potential clamping of workpieces with large diameters while maintaining a large clamping range up to comparatively small diameters, it is particularly advantageous to select a multi-tier design. In this case, the basic design with two coupling assemblies, the alternative as described above, is to be expanded as an internal coupling assembly by a plurality of external coupling assemblies, namely one external coupling assembly for each internal basic clamping support. The internal coupling assembly, in turn, respectively comprises an internal outer rocker and two internal basic clamping supports coupled thereto. The external coupling assembly equally comprises an external outer rocker as well as two external basic clamping supports.

It is particularly advantageous to connect the external outer rocker swivelably to the internal basic clamping support to this effect. In this respect, the internal basic clamping support virtually acts as a lateral slide for the external coupling assembly simultaneously. In this way, a two-tier design of the clamping device according to the invention is accomplished, wherein there is double the number of external basic clamping supports, I.e. normally this means eight supports, and consequently double the number of clamping points with the internal basic clamping supports, of which there are normally four.

Equally, it is particularly advantageous to connect both the internal and the external basic clamping supports swivelably to the respective internal or external outer rockers, each by means of internal or external compensating elements.

Furthermore, it is advantageous in the realization to position the internal basic clamping supports in the symmetry respectively between the two coupled external basic clamping supports. Here, the internal basic clamping supports can be designed with a predominantly long jaw guide almost reaching the axis of rotation, wherein the external basic clamping supports have a larger distance to the axis of rotation for spatial reasons, which does not do any harm, however, as the external basic clamping supports and respectively the clamping jaws mounted thereto are used in particular for clamping workpieces with large diameters.

In particular in connection with a perpendicular axis of rotation and a heavy workpiece weight on the clamping device it is particularly advantageous to attach at least two load supports to the device support, or to make it possible to attach them, wherein the abutting workpiece weight is supported by the load supports and wherein the workpiece does not abut on the clamping jaws in the direction of the axis of rotation. In this way, it is ensured that the clamping jaws can move freely in relation to one another and that the solution according to the invention can be used unconditionally.

With regard to the design of the device support, there are several options. The device support does not imperatively have to be understood as a single component, but it can also be an assembly of a plurality of components. In particular the necessity of introducing guides and bearings leads to a multi-tier structure which is advantageously oriented in the direction of the axis of rotation. Here, it is irrelevant how the individual components of the device support are fixed to one another. Normally, it can be expected that they are attached to one another by means of screw connections. Furthermore, it can be advantageous to add lubricants precisely to the guides or bearings, for instance the adjusting spindle. Equally, the design of the drive for the present invention is initially irrelevant, and the person skilled in the art will select the appropriate drive based on the selected realization of the adjusting drive. Advantageously, a drive is selected here which is compatible with the conventional chucks.

Furthermore, it is possible to envisage the clamping device as a unit belonging to the lathe, i.e. the clamping device is mounted in such a way that it is not envisaged normally to exchange it for another chuck. Alternatively, the clamping device according to the invention can be used as an exchangeable or additionally mountable chuck. In this respect, on the one hand it is possible to envisage a simple exchange of the lathe chuck for the clamping device according to the invention. On the other hand, in particular with horizontal chucks (or a perpendicular axis of rotation), a clamping device according to the invention can be mounted to the existing chuck as a separate unit.

The operation of the drive of the clamping device can in the simplest case be realized manually, which is normally sufficient. Alternatively, it is possible to envisage a hydraulic or pneumatic or electrical drive. In particular in connection with the embodiment with the wedge drive, the use of a hydraulic or pneumatic cylinder is preferable to the electrical solution.

In order to reduce the costs, it is advantageous to design all repeat parts identically. This particularly refers to the basic clamping supports, the outer rockers, the compensating elements as well as the coupling elements and, if applicable, the lateral slides. If wedge guides or a spindle drive are used for the adjustment, apart from the advantage of a uniform force distribution, there is also a cost advantage with regard to the structure and production, if the lateral slides are designed as mirror-imaged components.

It is obvious that components with the coupling elements as well as the central rocker have to be mounted swivelably in relation to another component if compensating elements and/or lateral slides are used. To this effect, the person skilled in the art is provided with several solutions, for instance to use a bolt with one component and loops with the other component. The person skilled in the art will allocate the bolt to the appropriate component as is convenient and according to the structural conditions and the allocation is independent of the concept of the invention.

The following figures give an outline of embodiments for a clamping device according to the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
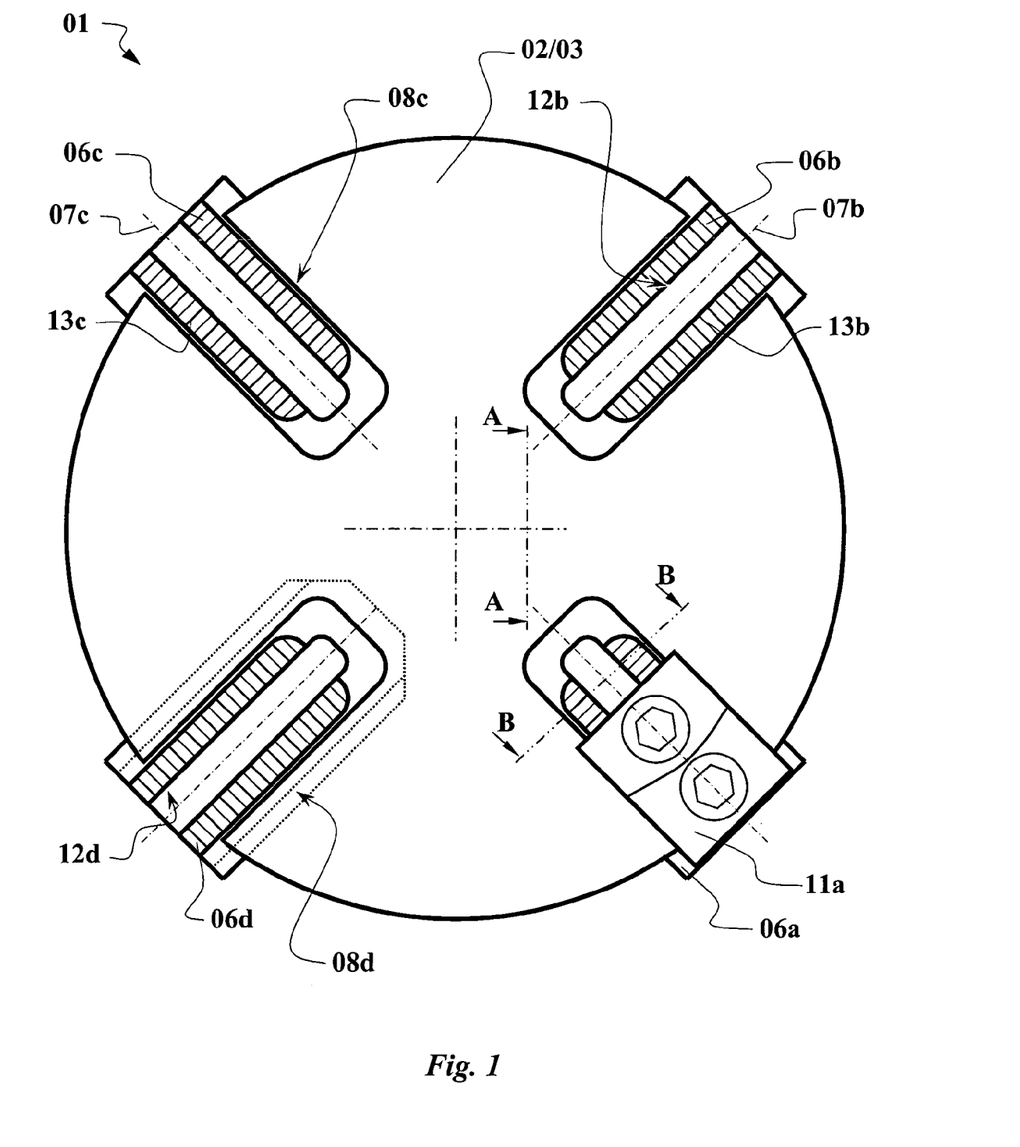
FIG. 1 is a first example of a clamping device according to the invention 01 in plan view with four basic clamping supports 06 as well as one clamping jaw 11.

Referring to the drawings in particular, in FIG. 1, a first embodiment of a clamping device according to the invention 01 is outlined as an example. First of all, it shows the device support 02, respectively the upper housing section 03 of the device support 02 in the circular form. In the device support 02, there are guide grooves in the form of the support guide 08a to 08d. The four basic clamping supports 06a to 06d are inserted into these guide grooves. Along the respective support orientations 07a to 07d, the respective basic clamping supports 06 can be slid in the support guides 08. Furthermore, a clamping jaw 11a on the basic clamping support 06a is outlined as an example. Here, the clamping jaw 11 can be moved along jaw guides 12 in parallel with the support guides 06. In this respect, the clamping jaw 11 can also be displaced radially in relation to the axis of rotation. In order to lock the position of the clamping jaw 11 in relation to the basic clamping support 06, the jaw guide comprises a detent toothing 13 on its upper section. In this respect, the clamping jaw 11 can be positioned on and fixed to the basic clamping support 06 in the detent interval of the detent toothing 13.

On examination of the clamping device 01 in FIG. 1, initially no relevant differences to a normal four jaw chuck according to the state of the art can be seen. In fact, this is only accomplished by the movement pattern and the drive coupling of the basic clamping supports 06 according to the invention.

Figure 2:
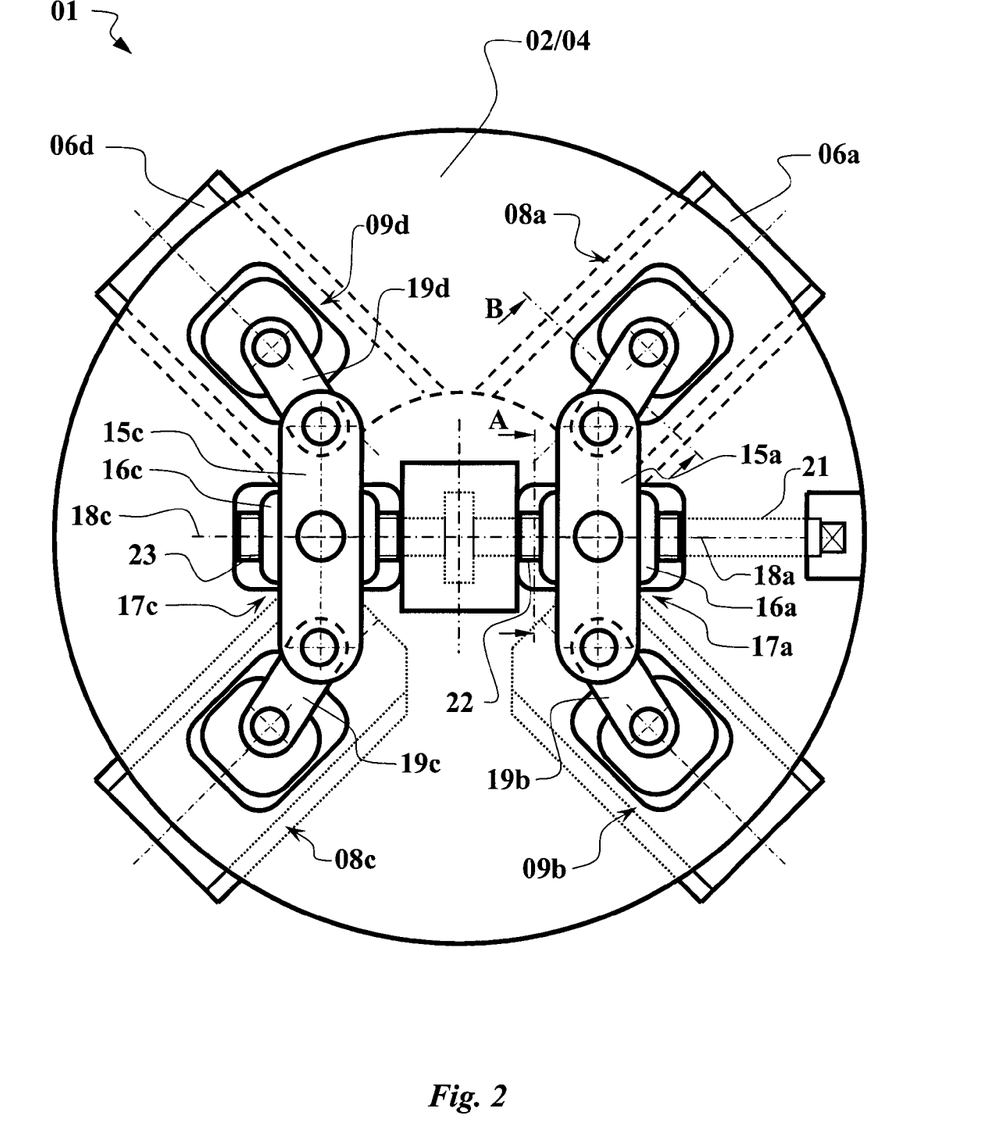
FIG. 2 is a bottom view of the clamping device 01 from FIG. 1.

To this effect, FIG. 2 shows a bottom view of the example of the clamping device 01 from FIG. 1. Again, the device support 02 can be seen initially, in this case the lower housing section 04. Projecting from the device support 02, the four basic clamping supports 06a to 06d can be seen. The covered guide 08 between the device support 02 and the basic clamping supports 06 is shown dashed (guide groove in the device support 02) or dotted (basic clamping support 06) in this case to clarify a possible position.

A feature according to the invention is that two basic clamping supports 06a and 06b, respectively 06c and 06d, are each coupled by an outer rocker 15a, respectively 15c. Here, the outer rockers 15 can be swiveled and there is a movable connection between the outer rocker 15 and the basic clamping supports 06. In this way, it becomes obvious that a displacement of a first basic clamping support, for instance 06a, toward the center or toward the axis of rotation by means of swiveling the outer rocker 15a leads to an outward displacement of the coupled basic clamping support 06b.

In order to compensate for the inevitable angular offset within the movement of the basic clamping supports 06 along their displaceability in the support orientation 07, compensating elements 19 are arranged between the outer rockers 15 and the respective basic clamping supports 06. In this respect, the movement of the basic clamping supports 06 is transferred by means of the compensating element 19, which is coupled by means of a bolt, onto the outer rocker 15, which is also coupled by means of a bolt.

Furthermore, in this embodiment the outer rocker 15 is mounted swivelably to a lateral slide 16 by means of a bolt. In this respect, the outer rocker 15 can be swiveled in relation to the lateral slide 16. In turn, the lateral slides 16 are respectively mounted in slide guides 17. Even though this is not imperative, this improves the stability of the whole embodiment. Here, the respective lateral slides 16a, respectively 16b, can be moved in the direction of thrust 18a, respectively 18b.

As a drive variation, an adjusting spindle 21 is used for this embodiment of the clamping device 01. Here, the adjusting spindle 21 penetrates the first lateral slide 16a by means of a left-hand thread 22 and the second, opposite lateral slide 16c by means of a right-hand thread 23. In this respect, it is obvious that a rotating movement of the adjusting spindle 21 leads to an opposite movement of the lateral slides 16a and 16b toward one another or away from one another. In order to ensure the symmetrical position of the lateral slides 16 and thus simultaneously of the coupled basic clamping supports 06 in the initial position, the adjusting spindle 21 is centered or rather positioned in the center or perpendicular in relation to the axis of rotation. In this way, it is ensured that both lateral slides 16 have the same distance to the axis of rotation. Due to the fact that the basic clamping supports 06 are coupled by means of the swivelable outer rocker 15 and by means of coupling the compensating elements 19, consequently the basic clamping supports 06 have the same distance to the axis of rotation, leaving the swivelability of the outer rocker 15 out of consideration.

Furthermore, a limitation assembly 09a to 09d with respect to each basic clamping support 06a to 06d can be seen. In this embodiment the limitation assembly 09 is realized in such a way that the basic clamping support 06 also penetrates a recess in the lower housing section 04 on the rear side. Here, the recess comprises two respective abutting surfaces in the support orientation 07, on which the penetrating section of the basic clamping supports 06 abuts at the end of the adjusting path. By means of a corresponding distance of the abutting surfaces to the axis of rotation it is ensured that the distance of the basic clamping supports 06 to the axis of rotation inward and outward is largely the same at the end of the two adjusting paths. In this respect, with the same position of the clamping jaws 11 on the basic clamping supports 06, a corresponding position of the clamping surfaces at the distance to the axis of rotation is realized. In this way, clamping workpieces in a position as centric as possible, in which the distance to the clamping surfaces can be used as orientation, is considerably promoted.

Figure 3:
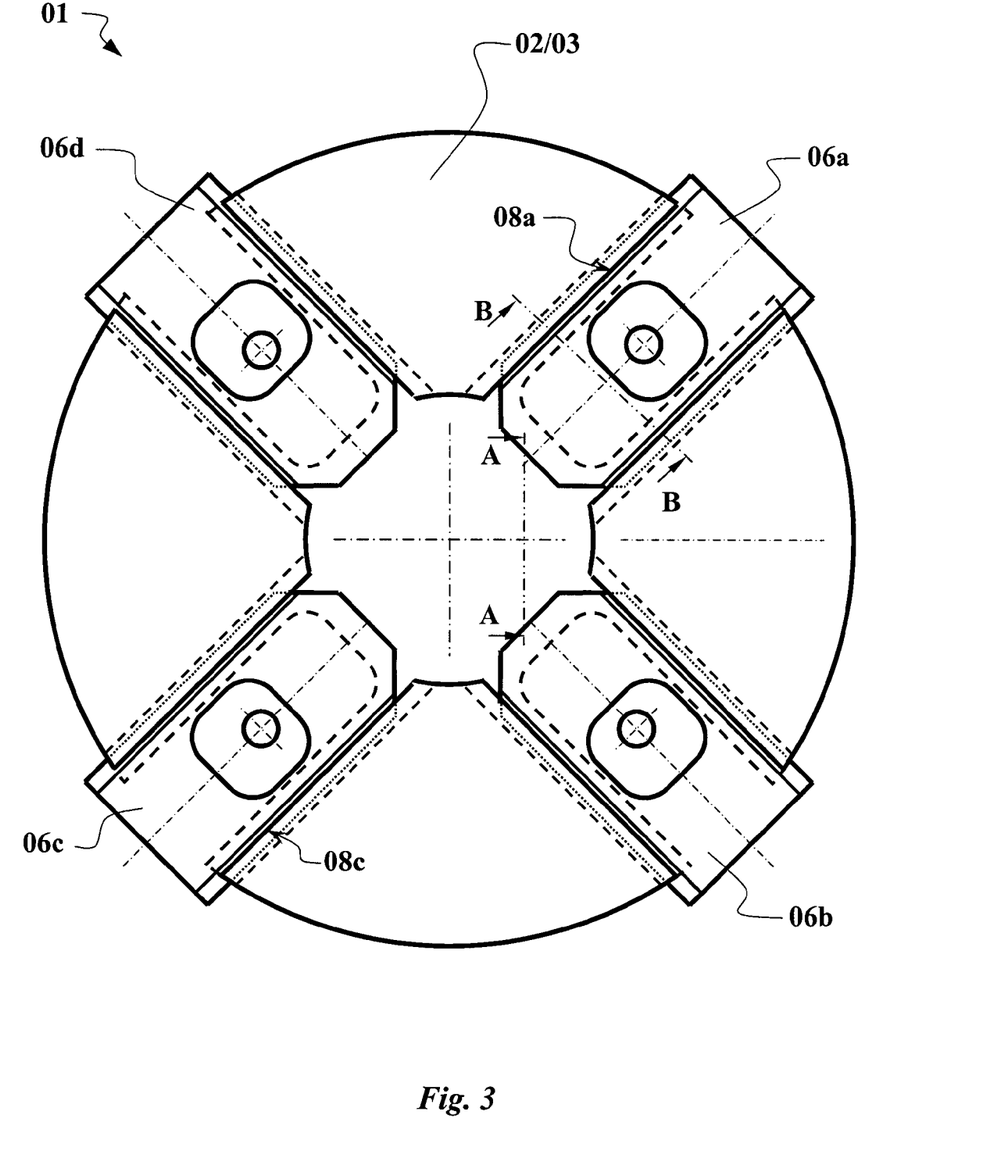
FIG. 3 additionally is a bottom view comparable with FIG. 2, omitting the lower housing section as well as the coupling assembly.

In order to further clarify the position of the basic clamping supports 06 in the device support 02, FIG. 3 outlines the clamping device 01, omitting the coupling assembly as well as the lower housing section 04. In this respect, the upper housing section 03 of the device support 02 can equally be seen in this bottom view. The support guides 08, in which the individual basic clamping supports 06 are mounted slidably, are arranged in a star-shaped formation and offset by 90 degrees each.

Figure 4:
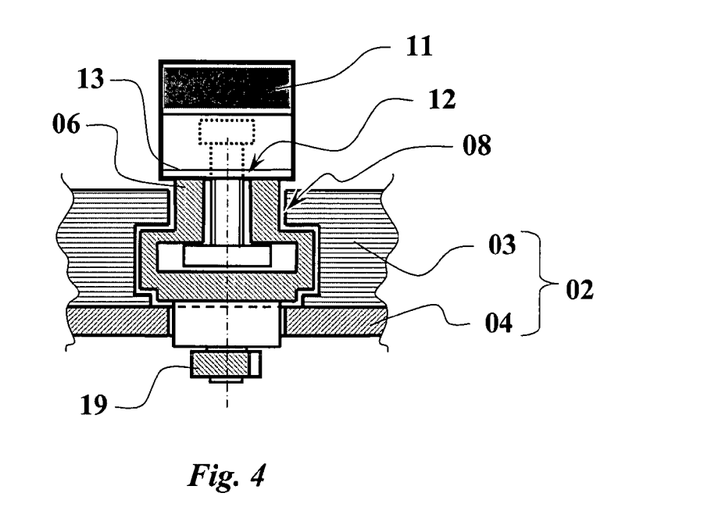
FIG. 4 is a cross section of the embodiment according to FIG. 1 along the intersection line B-B.

In a partial cross section along the intersection line B-B (see FIG. 1 to FIG. 3), FIG. 4 shows the arrangement of the basic clamping support 06a in the device support 02. Initially, it can be seen that in this embodiment, the device support 02 comprises an upper housing section 03 as well as a lower housing section 04. Here, the guide groove of the support guide 08 is integrated into the upper housing section 03. Therein, the basic clamping support 06, which in turn comprises a jaw guide 12 located within its contour, is located with an exemplarily matching contour. Within the jaw guide 12, the clamping jaw 11 can be displaced along the support orientation 07, wherein the positioning and locking of the position is realized by means of a detent toothing 13. Furthermore, it can be seen that the basic clamping support 06 penetrates the lower housing section 04 and that the compensating element 19 is attached swivelably at this penetration point.

Figure 5:
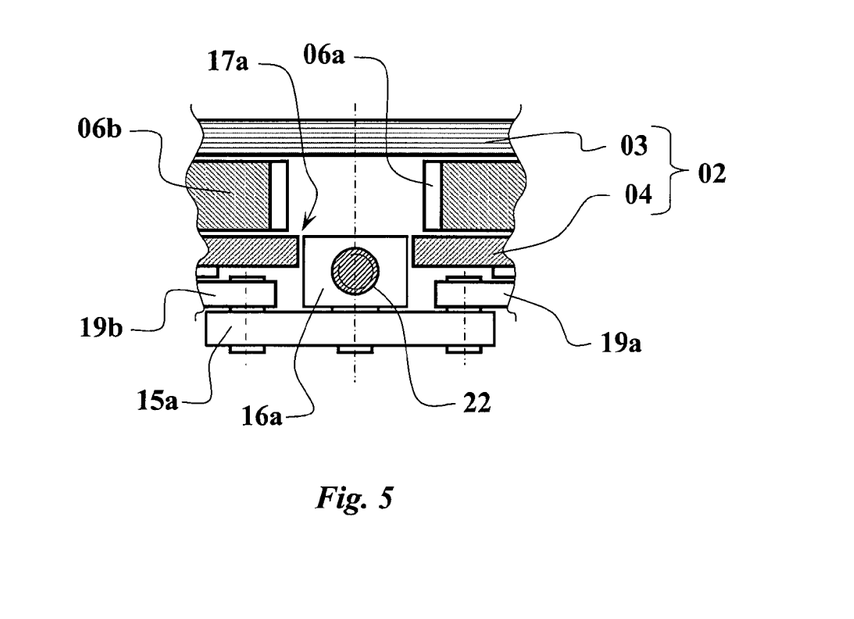
FIG. 5 is a cross section view of the embodiment according to FIG. 1 along the intersection line A-A.

Another partial cross section is outlined by FIG. 5 along the intersection line A-A (see FIG. 1 to FIG. 3) with the coupling assembly as well as with the drive. Again, the device support 02 can be seen with the upper housing section 03 and the lower housing section 04. To some extent, the basic clamping supports 06a, respectively 06b can also be seen on both sides. Said basic clamping supports are swivelably coupled with the outer rocker 15a by means of the compensating element 19a, respectively 19b. Said outer rocker 15a is in turn swivelably attached to the lateral slide 16a. The drive for the lateral slide 16a is provided by the adjusting spindle 21 in this embodiment, wherein the latter comprises a respective left-hand thread 22 in the lateral slide 16a. The lateral slide 16a is furthermore mounted within the slide guide 17a even though the bearing of the lateral slides 16 via the adjusting spindle 21 would already be sufficient.

Figure 6:
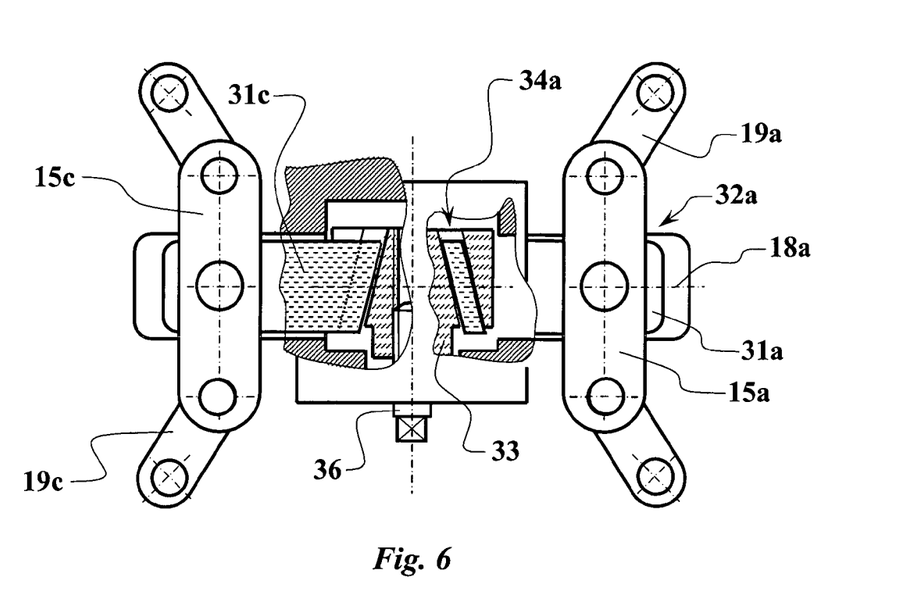
FIG. 6 is an embodiment of the adjusting device.

Alternatively to moving the lateral slides 16 by means of an adjusting spindle, there is the option to use a wedge guide. This is shown exemplarily in FIG. 6, wherein only the realization of the slide movement is described here. Again, the outer rockers 15a and 15b can initially be seen on both sides. They are each arranged swivelably on the respective lateral slides 31a, respectively 31c. The movement of the lateral slides 31a, respectively 31b, which are each mounted in corresponding slide guides 32a, respectively 32b, is realized by means of opposite wedge guides 34a, respectively 34b. Here, the drive is provided by means of the wedge element 33, which can in turn be displaced by means of the adjusting spindle 36. Consequently, displacing the wedge element 33, which is arranged perpendicular in relation to the orientation of the lateral slide 31, leads to a change of the distance in the wedge guides 34 and consequently to a movement of the lateral slides 31 toward one another, respectively away from one another.

Figure 7:
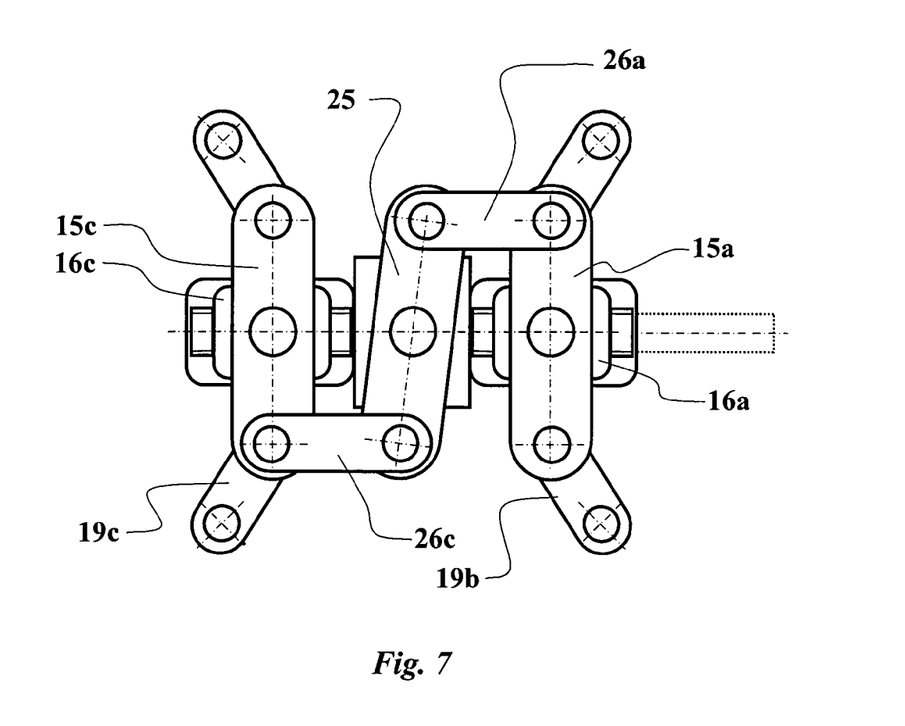
FIG. 7 is a variation of the coupling assembly.

In order to improve the centering when clamping workpieces, in an advantageous fashion an embodiment can be selected with an addition according to FIG. 7. This embodiment, which is again outlined only partially, also comprises the outer rockers 15a, respectively 15c on both sides. Independently of the drive of the outer rockers 15, the diagonal, opposite ends of the outer rockers 15a, respectively 15c, are coupled in this example. This is realized by means of arranging a central rocker 25 with a bearing corresponding to the axis of rotation at the device support 02, wherein the central rocker 25 is connected at both ends with one diagonal opposite end of the outer rockers 15a, respectively 15c, by means of coupling elements 26a, respectively 26c, arranged in between. These coupling elements 26 are also mounted swivelably on both sides. In this respect, it is obvious that displacing the basic clamping support 06a at the compensating element 19a leads to a corresponding movement of the opposite compensating element 19c and consequently of the basic clamping support 06c. Due to the fact that the coupling is realized by means of the outer rockers 15a, respectively 15c, there is an inevitable opposite movement of the other two basic clamping supports 06b, respectively 06d. By using the central rockers 25 and the coupling elements 26a, respectively 26c, centric clamping is thus facilitated considerably.

The first embodiment of the clamping device 01 with four basic clamping supports 06 thus presents a basic embodiment with two outer rockers 15 and four basic clamping supports 06 in each case. Equally, however, it is possible to increase or to multiply the number of basic clamping supports 06 and outer rockers 15. Even though it would also be possible to use, for instance, three outer rockers with six basic clamping supports, a particularly advantageous embodiment for large clamping devices in particular is outlined in FIG. 8, respectively FIG. 9. In this case, the clamping device 41 comprises four internal basic clamping supports 45a to 45d as well as eight external basic clamping supports 51a to 51h. In this way, it is now possible to clamp workpieces both at four clamping points and, alternatively, at eight clamping points simultaneously. This is promoted in particular by the fact that the basic clamping supports 45 and 51 are coupled in two tiers here.

Figure 8:
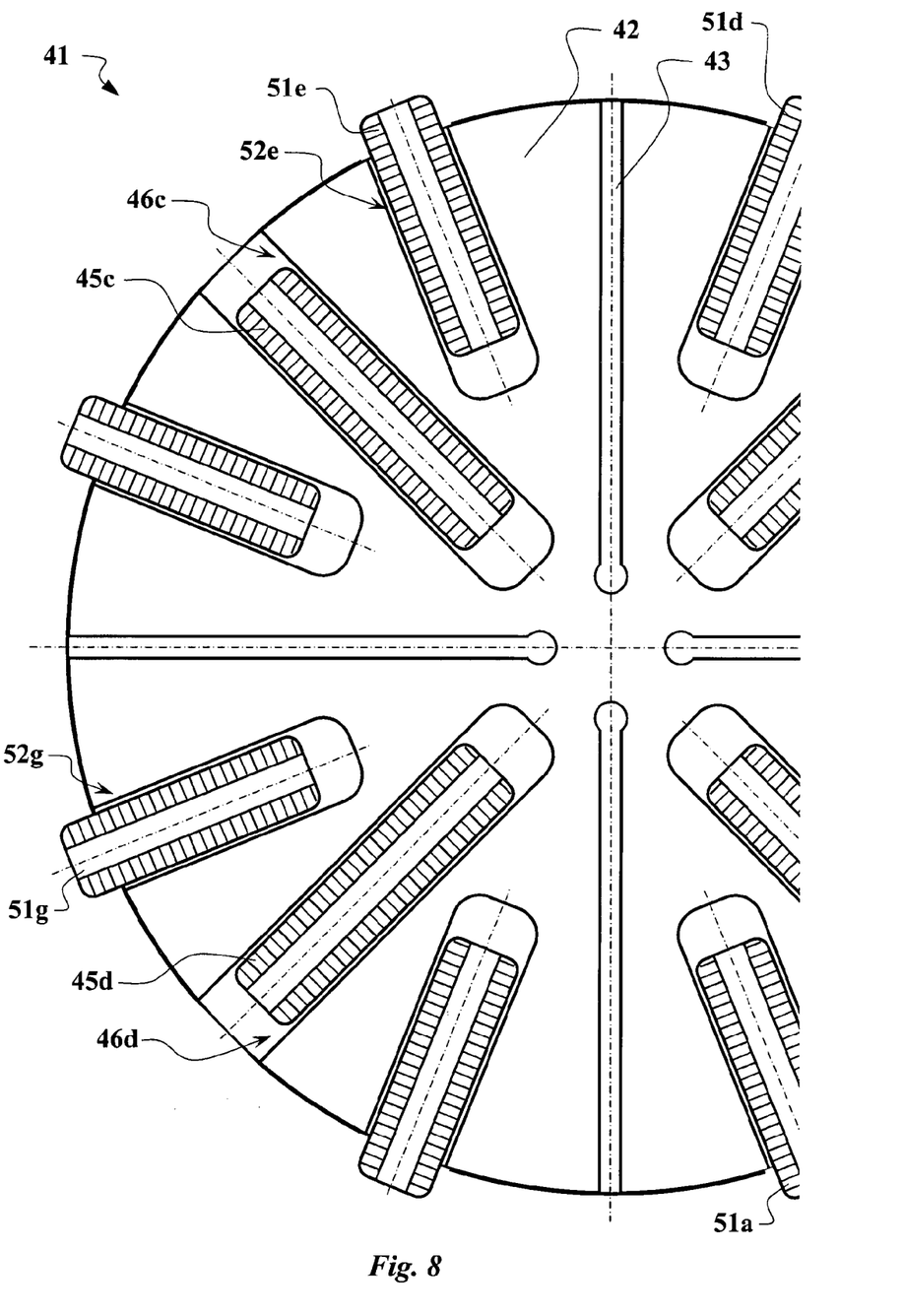
FIG. 8 is a second variation of the clamping device 41 according to the invention with four internal basic clamping supports 45 and eight external basic clamping supports 51.

Initially, the clamping device 41 again comprises a device support 42, wherein in this case, load support grooves are outlined on the upper surface. They are intended to realize a support in the direction of the axis of rotation in case of high loads without the load abutting on the individual basic clamping supports 45, 51. In this respect, the free displaceability of the basic clamping supports 45, 51 or of the respective clamping jaws is still ensured. In order to realize the load supports, any distancing elements can be used, which can be fixed correspondingly by means of the load support grooves 43. Furthermore, the clamping device 41 comprises the required support guides 46, respectively 52, with the respective basic clamping supports 45, respectively 51.

Figure 9:
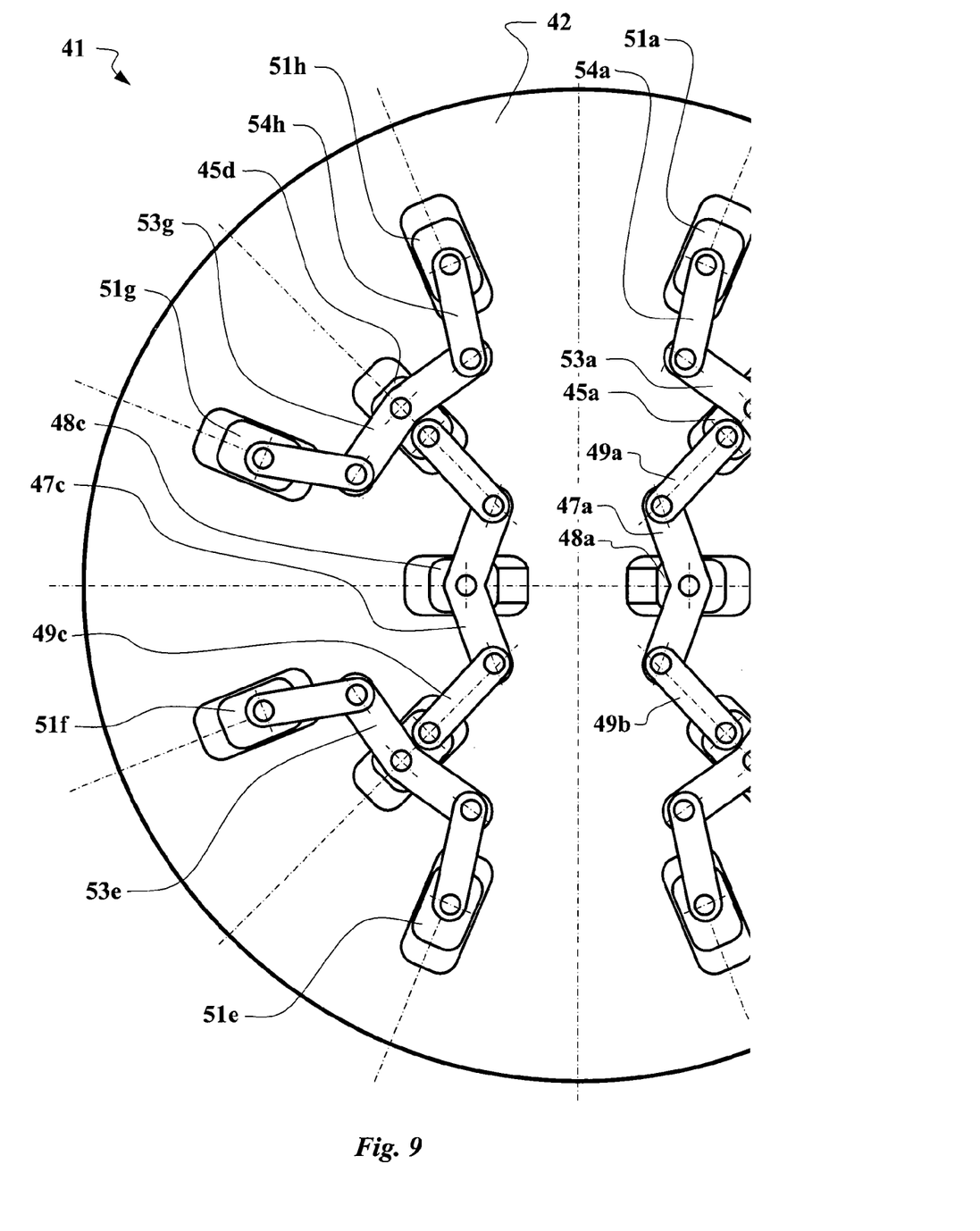
FIG. 9 is a bottom view of the embodiment according to FIG. 8.

This two-tier embodiment of the clamping device 41 is clarified by FIG. 9. Again, the internal basic clamping supports 45a to 45d, which are coupled with the two internal outer rockers 47a, respectively 47c, by means of internal compensating elements 49, can be seen. The internal outer rockers 47a, respectively 47c, are connected with internal lateral slides 48a, respectively 48c, in a manner corresponding to the embodiment of the clamping device 01. Consequently, with the clamping device 41, the embodiment of the internal basic clamping supports 45 corresponds to the embodiment of the clamping device 01 from FIG. 1.

The clamping device 41 in this embodiment is now complemented by a new coupling assembly with two external basic clamping supports 51 being added to each internal basic clamping support 45. In each case, two external basic clamping supports 51 are connected with an external outer rocker 53 by means of an external compensating element 54. Here, the external outer rocker 53 is again connected swivelably to the internal basic clamping support 45. In this respect, the internal basic clamping support 45 also represents the lateral slide for the external basic clamping supports 51.

In the clamping process in which the external basic clamping supports 51 are used, the movement is transferred in the following way, initially leaving a compensating movement by means of the outer rocker out of consideration: An adjusting movement of the internal lateral slides 48 toward one another leads to an entrainment of the internal basic clamping supports 45a to 45d in the direction of the axis of rotation via a transfer by means of the outer rockers 47a, respectively 47c, via the entrainment by means of the internal compensating elements 49a to 49d. The movement of the internal basic clamping supports 45 toward the axis of rotation, again as a kind of lateral slide, equally leads to a movement of the connected external outer rockers 53 and consequently to the entrainment of the coupled external compensating elements 54 and consequently to a displacement of the external basic clamping supports 51, again in the direction of the axis of rotation.

A shape deviating from roundness can now be compensated for as follows: If, for instance, in a clamping process the external basic clamping support 51f abuts on the workpiece first, another clamping movement results in a lead of the coupled basic clamping support 51e due to the starting swiveling movement of the external outer rocker 53e. If the external basic clamping support 51e subsequently abuts on the workpiece by means of the attached clamping jaw thereof, the movement of the internal basic clamping support 45c is blocked simultaneously.

Consequently, no further displacement can ensue at the respective internal compensating element 49c. The further adjusting movement for clamping the workpiece now results in a lead of the coupled second internal basic clamping support 45d by means of a swiveling of the internal outer rocker 47c. In this respect, further clamping can now be realized until the other two external basic clamping supports 51g and 51h also abut on the workpiece by means of the respective clamping jaws. It is obvious that flexible clamping of unround workpieces and of workpieces being not cylindrical in geometrical terms is possible by means of this solution and that a uniform clamping pressure can also be applied at all clamping points here. Consequently, deformations can be prevented in particular with workpieces that are prone to deformation.

While specific embodiments of the invention have been shown and described in detail to illustrate the application of the principles of the invention, it will be understood that the invention may be embodied otherwise without departing from such principles.

The invention claimed is:

1. A clamping device for use on a lathe or a face chuck, the clamping device comprising:
   a device support;
   a clamping jaw;
   an adjusting drive;
   an outer rocker;
   a plurality of support guides arranged in a star-shaped formation in relation to an axis of rotation in said device support, wherein one of said support guides, a basic clamping support on which at least said clamping jaw for clamping workpieces can be attached, is mounted slidably in one support orientation, the basic clamping supports being simultaneously adjusted in the respective support orientations by means of said adjusting drive, wherein at least two basic clamping supports are coupled directly or indirectly to one another by means of said outer rocker, wherein at least in a middle of an adjusting path of said basic clamping supports, a limited inward displacement of a basic clamping support leads to a swiveling of said outer rocker and to an outward displacement of the other coupled basic clamping support;
   a central rocker mounted swivelably to said device support;
   coupling elements, wherein one of said coupling elements is in each case attached swivelably to the two ends of the central rocker, wherein said coupling elements in turn have a swivelable connection diagonally across an axis of rotation with said outer rocker and/or a compensating element and/or a basic clamping support.

2. A clamping device according to claim 1, wherein the basic clamping support comprises a jaw guide arranged in parallel with one of said support guides.

3. A clamping device according to claim 2, wherein said jaw guide comprises a detent toothing, wherein said clamping jaw can be displaced along said jaw guide and can be fixed in a detent interval.

4. A clamping device according to claim 1, wherein the basic clamping support comprises two jaw guides arranged symmetrically to one of said support guides.

5. A clamping device according to claim 1, further comprising a swivelable pendulum apparatus mounted to the basic clamping support, wherein the pendulum apparatus comprises at least two jaw guides.

6. A clamping device according to claim 1, wherein said outer rocker comprises two outer rocker assemblies each connected to two basic clamping supports.

7. A clamping device according to claim 6, wherein said compensating element comprises one compensating element that is swivelable to both sides arranged between each of the two coupled basic clamping supports and the respective one of said rocker assemblies.

8. A clamping device according to claim 1, wherein said outer rocker is displacable linearly in a direction of thrust by means of said adjusting drive, wherein the two corresponding support orientations are arranged symmetrically to a plane formed by the direction of thrust and the axis of rotation.

9. A clamping device according to claim 8, wherein said outer rocker has a swivelable connection with a lateral slide and is displaceable in a direction of thrust, wherein said lateral slide is mounted in said device support and is movable in the direction of thrust by means of the adjusting drive.

10. A clamping device according to claim 9, wherein:
    said lateral slide comprises a first lateral slide and a second opposite lateral slide;
    said adjusting drive comprises an adjusting spindle arranged in line with the direction of thrust, wherein said adjusting spindle is mounted with a left-hand thread in said first lateral slide and with a right-hand thread in said second lateral slide; and
    a rotation of said adjusting spindle leads to said first lateral slide and said second lateral slide moving in opposite directions toward or away from one another.

11. A clamping device according to claim 9, further comprising a wedge element and a wedge guide, wherein:
    said adjusting drive comprises an adjusting spindle;
    said lateral slide comprises two lateral slides coupled with said wedge element by means of said wedge guide, wherein an adjusting movement of said wedge element in an adjusting direction by means of said adjusting spindle, perpendicularly to the direction of thrust, leads to an opposite movement of said lateral slides.

12. A clamping device according to claim 1, further comprising:

a limitation assembly with an internal and/or external end position, limiting the adjusting path of said basic clamping supports in the respective radial support orientations in a direction toward or away from the axis of rotation; and a swiveling movement of the corresponding outer rocker is prevented, wherein said basic clamping supports essentially have the same distance to the axis of rotation.

13. A clamping device according to claim 12, wherein in the end position, said basic clamping supports abut on abutting surfaces of said device support.

14. A clamping device according to claim 12, wherein said outer rocker comprises spaced abutting surfaces, which abut on the device support in the end position.

15. A clamping device according to claim 12, wherein the adjusting path of said basic clamping supports is between 1 mm and 50 mm.

16. A clamping device according to claim 1, further comprising a multi-tier assembly with at least two internal coupling assemblies, each with an internal outer rocker (47) and two coupled internal basic clamping supports, and comprising an external coupling assembly assigned to each internal basic clamping support, each with an external outer rocker and two coupled external basic clamping supports.

17. A clamping device according to claim 16, wherein said outer rocker is mounted swivelably to an internal said basic clamping support.

* * * * *